Patented June 2, 1931

1,808,205

UNITED STATES PATENT OFFICE

MANTON B. BRYANT AND WALTER J. BEATTY, OF DETROIT, MICHIGAN

WELDING

No Drawing.   Application filed January 10, 1928.   Serial No. 245,807.

This invention relates to welding, and particularly to the welding of high heat resisting alloy steel containing nickel and chromium.

An object of the invention is to provide a process for welding plates or sections of nickel chrome sheet steel, particularly adapted for use in the manufacture of boxes and covers therefor, which may be used in various manufacturing industries, such for example, as in automobile plants, for carbonizing stock, as for example gears, shafts, axles, motor parts, etc.

The invention, as employed for the purpose of making carbonizing boxes described in our co-pending application Serial No. 166,338, filed February 7, 1927, provides a box which is strong enough to sustain the weight of the stock to be carbonized, relatively long lived and which reduces materially the present high costs of carbonizing stock. The box has among various new characteristics certain outstanding advantages over the carbonizing boxes of the prior art. Certain of the advantages are those which relate to the heat resisting feature of the welded joints and the resistance to expansion and contraction under varying temperatures.

As fully described in our co-pending application previously referred to, we conceived the idea of making carbonizing boxes of sheet nichrome steel formed from blanks or sheets of proper size and welded together at their joints, thereby producing carbonizing boxes having many important advantages over the prior art boxes and having none of the serious defects and disadvantages thereof.

In attempting however to weld the edges of nichrome blanks or sheets we encountered serious difficulties in producing a satisfactory welded joint which would hold, especially under variations in temperatures ranging as high as 2400° F. To provide a carbonizing box which would be practicable in use, stand the desired number of heat hours, sustain the weight of stock, and resist expansion and contraction, it was important that the welded joint be as strong as the walls of the carbonizing box. Due to the hardness of the alloy the blanks could not be joined by the so-called water gas hammer method of welding, nor were we successful in resorting to the usual methods of welding.

We have discovered that the desired results could be accomplished by employing a welding rod or material containing a relatively high percentage of nickel, or a percentage in excess of the usual percentage of nickel which the ordinary nichrome steel contains. We have found in practice that by employing such a welding rod, the joints can be welded and that they resist the temperatures as high as from 1700° F. to 2400° F., to which the boxes are subjected during the carbonizing process. Moreover, the resistance to expansion and contraction under varying temperatures to which the welded joints formed in accordance with this invention must necessarily be subjected, constitutes an important characteristic and advantage thereof. Heretofore, it has been impossible to weld nichrome steel so as to produce a joint capable of resisting high temperatures, this being due in part to the fact that the welding material or rod did not contain a sufficient percentage of nickel.

Our invention has been successfully carried out in connection with the welding of nickel chrome steel having approximately the following analysis:

| | |
|---|---|
| Carbon | .20 |
| Manganese | .50 |
| Silicon | .50 |
| Sulphur | .025 |
| Phosphorus | .025 |
| Chromium | 17.00 to 20.00 |
| Nickel | 7.00 to 10.00 |
| Iron | 68.75 to 74.75 |

In using nickel chrome steel having the foregoing analysis, I have found, for example, that highly satisfactory results have been obtained by using a welding rod or material composed of the following elements in approximately the proportions given:

| | |
|---|---:|
| Manganese | .61 |
| Carbon | .30 |
| Nickel | 53.92 |
| Chromium | 16.73 |
| Iron | 23.99 |
| Silicon | 3.38 |

From the foregoing, it will be noted that the welding rod or material contains a much higher percentage of the element nickle than does the nickel chrome steel from which the articles are to be made.

The following analysis of a carbonizing box made in accordance with the invention indicates that the finished weld has a greater nickel content than that of the sheets welded:

| Welding rod | Sheet welded | Weld |
|---|---|---|
| M.— .61 | .00 | .00 |
| C.— .30 | .10 | .08 |
| Ni.—53.92 | 8.20 | 44.76 |
| Cr.—16.73 | 19.20 | 16.90 |
| Fe.—23.99 | 72.50 | 37.00 |
| Si.— 3.38 | .00 | .00 |

In welding the sheets or blanks the metal is preferably not pre-heated and a flux is not employed. Furthermore we have found in practice that a carbonizing instead of a neutral flame should preferably be employed. The welding is accomplished at the abutting edges of the sections by means of an acetylene torch and the nickel chrome rod, above described, without preheating the metal or using a flux.

It will be understood, however, that any suitable equivalent metals adapted for the purpose of carrying out our process may be substituted for the nickel and chromium content of the welding rod, as will be appreciated by those skilled in the art. Furthermore, although we have employed a welding material containing approximately 50 per cent. of nickel, a welding material containing as low as 35 per cent. nickel may be employed.

What we claim is:

1. The method of welding sections of sheet steel containing nickel and chromium for carbonizing boxes, which comprises welding the abutting edges by fusing therewith a welding material containing a relatively large amount of nickel as compared with the amount of nickel in the sections whereby the welded sections are adapted to withstand temperatures as high as 1700° F.

2. A carbonizing box composed of separate sections of sheet steel containing nickel and chromium having their abutting edges joined together by a welding material fused therewith and containing at least about 10% greater nickel content than the percentage of nickel in the sections whereby the welded sections are adapted to withstand temperatures of approximately 1700° F.

3. The method of joining sections of steel containing from about 17% to 20% chromium and from about 7% to 10% of nickel, which comprises presenting the edges of the sections in abutting relation, welding said edges by the application thereto in fused condition of a welding material containing at least about 10% greater nickel content than the percentage of nickel in the sections whereby the sections at the welded joints are adapted to withstand temperatures as high as 1700° F.

In testimony whereof we affix our signatures.

MANTON B. BRYANT.
WALTER J. BEATTY.